United States Patent [19]

Nordin et al.

[11] 3,886,144

[45] May 27, 1975

[54] OXAZOLO(AND OXAZINO)(3,2-D)PYRAZOLO-(3,4-F)(1,4)DIAZEPIN-5(6H)-ONE COMPOUNDS

[75] Inventors: Ivan C. Nordin; Horace A. Dewald, both of Ann Arbor, Mich.

[73] Assignee: Parke, Davis & Company, Detroit, Mich.

[22] Filed: Jan. 21, 1974

[21] Appl. No.: 434,762

[52] U.S. Cl. ... 260/239.3 T; 260/239.3 B; 424/248; 424/272; 424/273
[51] Int. Cl............................................ C07d 99/02
[58] Field of Search ............................. 260/239.3 T

*Primary Examiner*—Henry R. Jiles
*Assistant Examiner*—Robert T. Bond

[57] ABSTRACT

Oxazolo(and oxazino)[3,2-d]pyrazolo[3,4-f][1,4]-diazepin-5(6H)-ones and methods for the preparation are disclosed. The compounds can be prepared by one or more of the following procedures: Reaching the appropriately substituted pyrazolodiazepinone with an alkylene oxide; cyclizing the appropriately substituted 5-aroyl-4-[2-(hydroxyalkylamino)acetamido]pyrazole via heat or an acid catalyst; reacting the appropriately substituted Schiff base of a pyrazole and/or oxazolidine of a pyrazole with a haloacylhalide in the presence of a base; reacting the appropriately substituted oxazolopyrazolodiazepinone or oxazinopyrazolodiazepinone with an alkylating agent in the presence of a base. The compounds are pharmacological agents, especially anticonvulsants.

6 Claims, No Drawings

OXAZOLO(AND OXAZINO)(3,2-D)PYRAZOLO-(3,4-F)(1,4)DIAZEPIN-5(6H)-ONE COMPOUNDS

SUMMARY AND DETAILED DESCRIPTION

The present invention relates to new heterocyclic nitrogen compounds that are useful as pharmacological agents and to methods for their production. More particularly, the invention relates to new oxazolo(and oxazino)[3,2-d]pyrazolo-[3,4-f][1,4]diazepin-5(6H)-one compounds having the formula

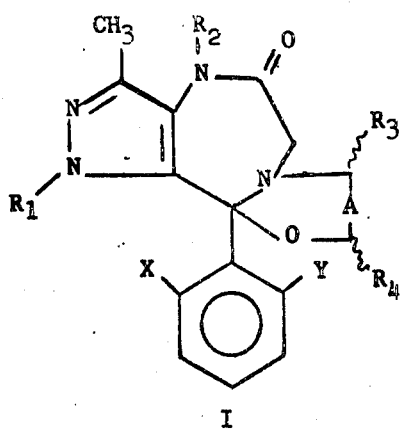

I wherein $R_1$ is a branched or straight chain hydrocarbon group of from one to four carbon atoms, preferably one to three, $R_2$ and $R_3$ are hydrogen or methyl, $R_4$ is hydrogen, methyl, ethyl, of phenyl, X and Y are hydrogen or fluorine, and A is a single bond or a methylene radical; with the provisio that at least one of $R_3$ and $R_4$ is hydrogen; and when A is methylene both $R_3$ and $R_4$ are hydrogen.

In accordance with the invention, oxazolo[3,2-d]-pyrazolo[3,4-f][1,4]diazepin-5(6H)-one compounds (I) having the foregoing formula wherein A is a single bond and $R_3$ is hydrogen, are produced by reacting a compound of the formula

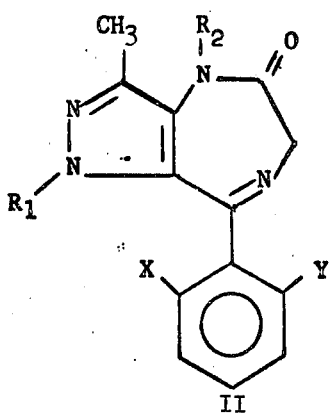

II with a compound of the formula

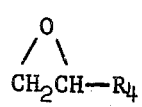

wherein $R_1$, $R_2$, $R_4$, X and Y are as previously defined, in the presence of a Lewis acid, such as aluminum chloride, stannic chloride, boron trifluoride and titanium tetrachloride. The preferred catalysts are aluminum chloride and stannic chloride.

Equimolar quantities of reactants and catalyst may be used. It is preferred however to use a slight to moderate excess of catalyst and a moderate to large excess (threefold) of alkylene oxide.

Most organic solvents which are inert to the above reactants and catalysts may be employed. The preferred solvents include aromatic hydrocarbons, such as benzene, toluene and xylene; chlorinated hydrocarbons, such as chloroform and dichloromethane; and mixtures of these. The two most preferred solvents are benzene and dichloromethane.

While the temperature range and time are not critical, generally, a temperature range of 0° to 100° C. for 5 to 30 hours are used with the longer times being employed at the lower temperatures. When employing aluminum chloride as the catalyst, generally lower temperatures are used.

The starting materials of the structure of formula II are prepared by the general methods disclosed in U.S. Pat. No. 3,557,095 and Canadian Pat. No. 878,513, which are incorporated by reference.

A second method for preparing compounds of this invention (I), wherein $R_2$ is hydrogen, involved the cyclization of a 5-aroyl-4-[2-(hydroxyalkylamino)acetamido]-pyrazole of the formula

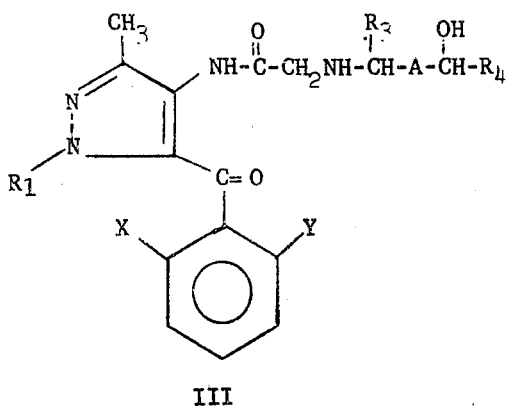

III wherein $R_1$, $R_3$, $R_4$, A, X, and Y are as previously defined.

The cyclization may be accomplished by heat alone; however, the preferred method requires the use of a catalyst with or without heat. The catalysts which promote the ring closure are acid catalysts, such as mineral acids, e.g., hydrochloric acid and sulfuric acid; hydrocarbon sulfonic acids, e.g., p-toluene sulfonic acid and methanesulfonic acid and organic acids, e.g., acetic acid and propionic acid. The acids may be formed in situ, e.g., from the reaction between sodium acetate and hydrogen bromide.

A wide variety of solvents may be used in the cyclization reaction, such as branched or straight chain lower alkanols of up to about six carbon atoms, e.g., methanol, ethanol and 2-propanol; tertiary amines, e.g., triethylamine and pyridine; hydrocarbons, e.g., benzene and toluene; and mixtures of the aforementioned solvents.

While numerous factors dictate the temperature to be used in the ring closure reactions, e.g., the more sterically hindered compounds require higher temperatures and/or longer heating periods, a range of from about 50° to about 150° C. for from approximately 12 hours to approximately 4 days is generally quite satisfactory. The quantity of catalyst may also vary but is generally in the range of 0.5 to 2 percent.

The starting materials of the formula III are prepared by reacting a compound of the structure of formula

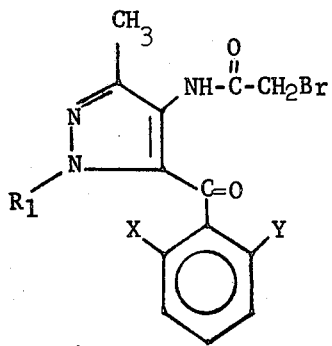

IV wherein $R_1$, X and Y are as previously defined, which is prepared according to the general procedures given in U.S. Pat. No. 3,557,095, issued Jan. 19, 1971, with a compound of the formula

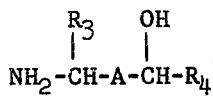

wherein $R_3$, $R_4$, and A are as previously defined.

Another method for preparing the compounds of this invention wherein $R_2$ and $R_3$ are hydrogen and A is a single bond comprises reacting a compound which may be represented by one of the following formulae

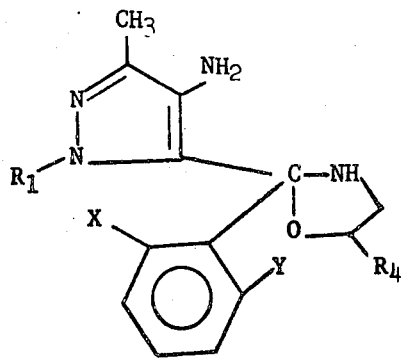

VI

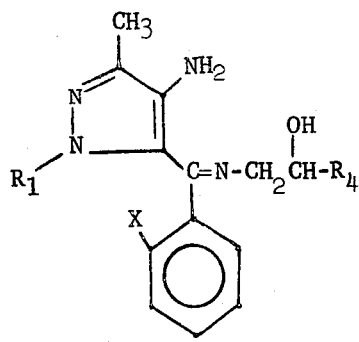

VII wherein $R_1$, $R_4$, X and Y are as previously defined, and equilibrium mixtures thereof with a haloacetyl halide of the formula

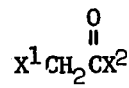

wherein $X^1$ and $X^2$ are halogen, preferably bromine, in the presence of a base. Typical bases are pyridine, trimethylamine, triethylamine, tributylamine, quinoline and N,N-dimethylaniline; a preferred base is pyridine. Generally, equimolar amounts of the reactants are employed, although a slight excess of haloacetyl halide, which may be as high as ten percent, is preferred. The solvents that may be employed in the above reaction include aromatic hydrocarbons, such as benzene, toluene and zylene; chlorinated hydrocarbons, such as chloroform and dichloromethane; ethers, such as tetrahydrofuran and dioxane; and mixtures thereof. A preferred solvent is dioxane.

While the reaction temperature and time are not critical, generally a range of 0° to 50° C. for from 2 to 24 hours is employed. A preferred range is about 0° to 15° C. for about 15 to 45 minutes followed by raising the temperature to 20° to 30° C. for from 10 to 16 hours.

The starting material represented by the formulae VI and/or VII is prepared by reacting a compound of the formula

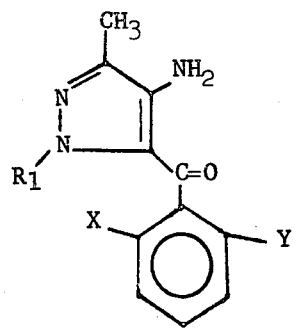

VIII with a compound of the formula

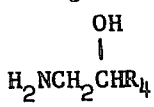

wherein $R_1$, $R_4$, X and Y are as previously defined. The compounds are generally heated together at 170° to 180° C. for about 4 hours in the absence of a solvent and the product is removed by distillation at reduced pressure. The compounds of the formula VIII are generally prepared according to procedures given in U.S. Pat. No. 3,557,095.

Lastly, compounds of this invention wherein $R_2$ is methyl are prepared by reacting a compound of the formula

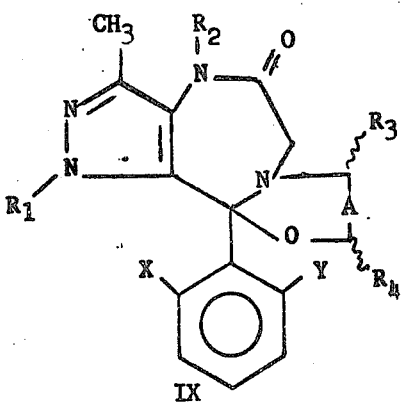

wherein $R_1$, $R_3$, $R_4$, A, X and Y are as previously defined, with an alkylating agent of the formula $$CH_3X^3$$

wherein $X^3$ is a halide, sulfate or hydrocarbon sulfonate, in the presence of a strong base. The preferred alkylating agent is methyl iodide. Strong bases, which includes alkali metal hydrides, such as sodium hydride and lithium hydride; alkali metal amides, such as sodamide and potassium amide; and alkali metal alkoxides, such as sodium methoxide and sodium ethoxide are utilized in this reaction. A preferred base is sodium hydride. Although equimolar quantities of reactants may be employed, it is preferred to use a slight excess of from 10 to 20 percent of both alkylating agent and base.

Solvents that may be used in this reaction include tertiary amides, such as dimethylformamide, N,N-dimethylacetamide and N-methyl-2-pyrrolidinone; ethers, such as diethyl ether, dioxane and tetrahydrofuran; hydrocarbons, such as benzene and toluene; dimethyl sulfoxide; and mixtures of these. A preferred solvent is dimethylformamide.

The temperature and times are not critical, and generally a range of 0° to 50° C. for from 1 to 24 hours is employed, preferably, 5° to 25° C. for 2 to 6 hours.

The starting materials of the structure of formula IX, used in this process are prepared from compounds of the formula III by way of the previously described cyclization reaction.

The compounds of this invention are isolated in the form of their free bases. It should be noted that the compounds of this invention are capable of existing in isomeric forms and, in point of fact, some of the compounds appear to be isolated as mixtures of cis and trans isomers as shown in the structural formulae.

This invention is intended to encompass the numerous isomeric forms, such as the cis isomers, trans isomers and mixtures, thereof.

The compounds of the invention are new chemical compounds that are useful as pharmacological agents. As such, they exert a depressant effect upon the central nervous system that is shown by their ability to prevent the occurrence of convulsions in laboratory animals following the administration of pentamethylenetetrazole and also by their ability to overcome inhibited behavior in animals placed in an anxiety-producing situation.

The anticonvulsant activity of the compounds of the invention is measured in a standard test that is carried out essentially as described by Chen, et al., *A.M.A. Archives of Neurology and Psychiatry*, Vol. 66, pages 329–337 (1951), and Vol. 68, pages 498–505 (1952), and by Chen, et al., *Journal of Pharmacology and Experimental Therapeutics*, Vol. 103, pages 54–61 (1951). In this test, each of a group of 5 rats is given a measured oral dose of a test compound, dissolved in water or suspended with acacia, followed 30 minutes later by a subcutaneous dose of 93 mg./kg. of pentamethylenetetrazole. This quantity of pentamethylenetetrazole quickly produces convulsions in 98–100% of untreated control rats. The treated animals are then observed visually for 30 minutes following administration of pentamethylenetetrazole, and anticonvulsive activity is judged by noting the time of onset and severity of clonic convulsive seizures and the number of animals completely protected from convulsions. The activity of a test compound at each dosage level is rated as follows: 4+, protection of all 5 rats; 3+, protection of 3 or 4 rats; 2+, protection of one or 2 rats; 1+, delay in onset; 0, no effect.

The results obtained for representative compounds of the present invention when tested by the foregoing procedure are shown in the following table.

ACTIVITY TABLE

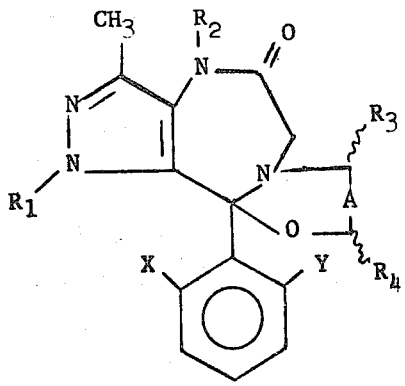

ACTIVITY TABLE—Continued

| $R_1$ | $R_2$ | $R_3$ | $R_4$ | X | Y | A | Dose (mg./kg.) | Rating |
|---|---|---|---|---|---|---|---|---|
| $C_2H_5$ | H | H | H | H | H | — | 8 | 4 |
|  |  |  |  |  |  |  | 4 | 3 |
|  |  |  |  |  |  |  | 2 | 0 |
| n—$C_3H_7$ | H | H | H | H | H | — | 16 | 4 |
|  |  |  |  |  |  |  | 8–4 | 1 |
|  |  |  |  |  |  |  | 2 | 0 |
| $CH_3$ | H | H | H | F | F | — | 16 | 4 |
|  |  |  |  |  |  |  | 8 | 3 |
|  |  |  |  |  |  |  | 4 | 4 |
|  |  |  |  |  |  |  | 2 | 0 |
| $CH_3$ | H | H | $CH_3$ | H | H | — | 63 | 4 |
|  |  |  |  |  |  |  | 32 | 1 |
|  |  |  |  |  |  |  | 16 | 1 |
|  |  |  |  |  |  |  | 8 | 0 |
| $C_2H_5$ | H | H | $CH_3$ | H | H | — | 2 | 4 |
|  |  |  |  |  |  |  | 1 | 1 |
|  |  |  |  |  |  |  | 0.5 | 0 |
| $C_2H_5$ | H | H | $C_2H_5$ | H | H | — | 16 | 4 |
|  |  |  |  |  |  |  | 8 | 3 |
|  |  |  |  |  |  |  | 4 | 0 |
| $C_2H_5$ | H | H | $CH_3$ | H | F | — | 8 | 4 |
|  |  |  |  |  |  |  | 4 | 1 |
|  |  |  |  |  |  |  | 2 | 0 |
| $CH_3$ | H | H | H | H | F | — | 8 | 4 |
|  |  |  |  |  |  |  | 4 | 0 |
| $CH_3$ | H | H | $CH_3$ | H | F | — | 8 | 4 |
|  |  |  |  |  |  |  | 4 | 2 |
|  |  |  |  |  |  |  | 2 | 0 |
| $C_2H_5$ | H | H | H | H | F | — | 8 | 4 |
|  |  |  |  |  |  |  | 4 | 3 |
|  |  |  |  |  |  |  | 2 | 0 |
| $CH_3$ | H | H | $CH_3$ | F | F | — | 4 | 4 |
|  |  |  |  |  |  |  | 2 | 0 |
| $C_2H_5$ | H | H | $CH_3$ | F | F | — | 8 | 4 |
|  |  |  |  |  |  |  | 4 | 0 |
| $C_2H_5$ | H | $CH_3$ | H | H | H | — | 32 | 4 |
|  |  |  |  |  |  |  | 16 | 1 |
|  |  |  |  |  |  |  | 8 | 1 |
|  |  |  |  |  |  |  | 4 | 0 |
| $C_2H_5$ | H | H | H | F | F | — |  |  |
| $C_2H_5$ | H | H | $C_6H_5$ | H | H | — | 8 | 4 |
|  |  |  |  |  |  |  | 4 | 0 |
| $C_2H_5$ | H | H | H | H | H | —$CH_2$— | 32 | 4 |
|  |  |  |  |  |  |  | 16 | 1 |
|  |  |  |  |  |  |  | 8 | 0 |
| $C_2H_5$ | $CH_3$ | H | $CH_3$ | H | H | — | 32 | 4 |
|  |  |  |  |  |  |  | 16 | 3 |
|  |  |  |  |  |  |  | 8 | 0 |
| $CH_3$ | $CH_3$ | H | $CH_3$ | F | F | — | 8 | 4 |
|  |  |  |  |  |  |  | 4 | 0 |
| $C_2H_5$ | $CH_3$ | H | H | F | F | — |  |  |

The invention is illustrated by the following examples.

EXAMPLE 1

A mixture of 13.4 g. of 1-ethyl-4,6-dihydro-3-methyl-8-phenylpyrazolo[4,3-e[[1,4]diazepin-5(1H)-one (U.S. Pat. No. 3,557,095) and 13.3 g. of aluminum chloride in 300 ml. of benzene is stirred at room temperature for 15 minutes, cooled to 10° and treated with 10 ml. of ethylene oxide. After the initial exothermic reaction (temperature rises to about 35°) has subsided, the mixture is cooled again to 10°, 15 ml. of ethylene oxide is added, the mixture is stirred at room temperature for 16 hours, then filtered. The filtrate is evaporated at reduced pressure and the residue is stirred with a mixture of dichloromethane and concentrated aqueous ammonia. The organic phase is separated, washed with water, dried and evaporated at reduced pressure to give 1-ethyl-4,8,9,10a-tetrahydro-3-methyl-10a-phenyl-1H-oxazolo[3,2-d]pyrazolo-[3,4-f][1,4]diazepin-5(6H)-one; m.p. 204°–205° after crystallization from ethyl acetate-pentane and from ethyl acetate using a charcoal treatment.

EXAMPLE 2

Utilizing the general procedure of Example 1, the following oxazolo[3,2-d]pyrazolo[3,4-f][1,4]diazepin-5(6H)-one compounds are obtained:

a. From 14.1 g. of 4,6-dihydro-3-methyl-8-phenyl-1-propylpyrazolo[4,3-e][1,4]diazepin-5(1H)-one (U.S. Pat. No. 3,700,657), 35 ml. of ethylene oxide and 13.3 g. of aluminum chloride in 300 ml. of benzene, one obtains 4,8,9,10a-tetrahydro-3-methyl-10a-phenyl-1-propyl-1H-oxazolo[3,2-d]pyrazolo[3,4-f][1,4]diazepin-5-(6H)-one, m.p. 181.5°–183° after crystallization from ethyl acetate using a charcoal treatment.

b. From 10 g. of 8-(2,6-difluorophenyl)-4,6-dihydro-1,3-dimethylpyrazolo[4,3-e][1,4]diazepin-5(1H)-one, 7 ml. of ethylene oxide and 5.0 g. of aluminum chloride in 200 ml. of benzene, one obtains 10a(2,6-difluorophenyl)-4,8,9,10a-tetrahydro-1,3-dimethyl-1H-oxazolo[3,2-d]pyrazolo[3,4-f][1,4]diazepin-5(6H)-one; m.p. 193°–195° (dec.) after crystallization from ether.

EXAMPLE 3

To a stirred mixture of 25.4 g. of 4.6-dihydro-1,3-dimethyl-8-phenylpyrazolo[4,3-e][1,4]diazepin-5(1H)-one in 1 liter of benzene is added 11.7 ml. of stannic chloride and, after a mildly exothermic reaction, 17.4 g. of propylene oxide. The resulting mixture is stirred and heated at reflux for 24 hours, then evaporated at reduced pressure. The residue is stirred thoroughly with a mixture of 750 ml. of dichloromethane and 250 ml. of concentrated aqueous ammonia. The organic phase is separated, washed with water, dried and evaporated at reduced pressure to give 4,8,9,10a-tetrahydro-1,3,9-trimethyl-10a-phenyl-1H-oxazolo[3,2-d]pyrazolo[3,4-f][1,4]-diazepin-5(6H)-one; m.p. 202°–205.5° after crystallization from ethanol and from aqueous ethanol using charcoal treatment.

EXAMPLE 4

Utilizing the general procedure of Example 3, the following oxazolo[3,2-d]pyrazolo[3,4-f][1,4]diazepin-5(6H)-one compounds are obtained:

a. From 26.8 g. of 1-ethyl-4,6-dihydro-3-methyl-8-phenylpyrazolo[4,3-e][1,4]diazepin-5(1H)-one (U.S. Pat. No. 3,557,095), 17.4 g. of propylene oxide and 11.7 ml. of stannic chloride in 1 liter of benzene, one obtains 1-ethyl-4,8,9,10a-tetrahydro-3,9-dimethyl-10a-phenyl-1H-oxazolo[3,2-d]pyrazolo[3,4f][1,4]diazepin-5(6H)-one; m.p. 205°–207° after crystallization from acetonitrile.

b. From 13.4 g. of 1-ethyl-4,6-dihydro-3-methyl-8-phenylpyrazolo[4,3-e][1,4]diazepin-5(1H)-one (U.S. Pat. No. 3,557,095), 10.8 g. of 1,2-epoxybutane and 5.9 ml. of stannic chloride in 500 ml. of benzene, one obtains 1,9-diethyl-4,8,9,10a-tetrahydro-3-methyl-10a-phenyl-1H-oxazolo-[3,2-d]pyrazolo[3,4-f][1,4]diazepin-5(6H)-one, m.p. 149°–179° after crystallization from toluene-pentane.

c. From 13.3 g. of 8-(o-fluorophenyl)-1-ethyl-4,6-dihydro-3-methylpyrazolo-[4,3-e][1,4]diazepin-5(1H)-one, 8.1 g. of propylene oxide and 5.4 ml. of stannic chloride in 500 ml. of benzene, one obtains 1-ethyl-10a-(o-fluorophenyl)-4,8,9,10a-tetrahydro-3,9-dimethyl-1H-oxazolo[3,2-d]pyrazolo[3,4-f][1,4]diazepin-5(6H)-one; m.p. 199°–201° after two crystallizations from chloroform-pentane and one from aqueous ethanol.

EXAMPLE 5 a. To a stirred solution of 13.6 g. of 8-(o-fluorophenyl)-4.6-dihydro-1,3-dimethylpyrazolo[4,3-e][1,4]-diazepin-5(1H)-one in 500 ml. of dichloromethane is added 5.8 ml. of stannic chloride. The mixture is cooled to 5° and 5 ml. of ethylene oxide is added. The mixture is stirred at 5°–10° for 1 hour, an additional 5 ml. of ethylene oxide is added and stirring is continued at room temperature for 22 hours. The mixture is stirred thoroughly with 250 ml. of concentrated aqueous ammonia, then filtered. The organic phase is separated from the filtrate, washed with water, dried and evaporated at reduced pressure to give 10a-(o-fluorophenyl)-4,8,9,10a-tetrahydro-1,3-dimethyl-1H-oxazolo[3,2-d]pyrazola[3,4-f][1,4]diazepin-5(6H)-one; m.p. 211°–215° after two crystallizations from ethanol.

b. By substituting 500 ml. of chloroform for the dichloromethane and substituting two 4.4 g. portions of propylene oxide for the ethylene oxide in Example 5, there is obtained 10a-(o-fluorophenyl)-4,8,9,10a-tetrahydro-1,3,9-trimethyl-1H-oxazolo[3,2-d]pyrazolo[3,4-f]-[1,4]diazepin-5(6H)-one; m.p. 208°–210° after crystallization from aqueous ethanol, from chloroform-ether and from ethanol.

EXAMPLE 6 a. To a stirred mixture of 14.3 g. of 1-ethyl-8-(o-fluorophenyl)-4,6-dihydro-3-methylpyrazolo[4,3-e]-[1,4]diazepin-5(1H)-one in 500 ml. of benzene is added 5.9 ml. of stannic chloride. The mixture is cooled to 15°, treated with 8 ml. of ethylene oxide, stirred at room temperature for 45 minutes, then at reflux temperature for 5 hours and evaporated at reduced pressure. The residue is stirred thoroughly with a mixture of dichloromethane and concentrated aqueous ammonia. The organic phase is separated, washed with water, dried and evaporated at reduced pressure to give 1-ethyl-10a-(o-fluorophenyl)-4,8,9,10a-tetrahydro-3-methyl-1H-oxazolo[3,2-d]pyrazolo-[3,4-f][1,4]diazepin-5(6H)-one; m.p. 223.5°–226° after crystallization from aqueous ethanol.

b. From 8.9 g. of 8-(2,6-difluorophenyl)-1-ethyl-4,6-dihydro-3,4-dimethylpyrazolo[4,3-e][1,4]diazepin-5(1H)-one in 600 ml. of benzene, 7.5 g. of stannic chloride and 4.5 g. of ethylene oxide, following the above procedure there is obtained 10a-(2,6-difluorophenyl)-1-ethyl-4,8,9,10a-tetrahydro-3,4-dimethyl-1H-oxazolo[3,2-d]pyrazolo-[3,4-f][1,4]diazepin-5(6H)-one.

EXAMPLE 7

A stirred mixture of 10 g. of 8-(2,6-difluorophenyl)-4,6-dihydro-1,3-dimethylpyrazolo[4,3-e][1,4]-diazepin-5(1H)-one and 650 ml. of benzene is cooled to 0°–5° and treated dropwise with 9 g. of stannic chloride, then with 6 g. of propylene oxide. The mixture is stirred and heated at reflux for 24 hours, then evaporated at reduced pressure. The residue is stirred thoroughly with 350 ml. of dichloromethane and 75 ml. of concentrated aqueous ammonia. The organic phase is separated, washed with water, dried and evaporated at reduced pressure to give 10a-(2,6-difluorophenyl)-4,8,9,10a-tetrahydro-1,3-9-trimethyl-1H-oxazolo[3,2-d]pyrazolo[3,4-f][1,4]diazepin-5(6H)-one; m.p. 178°–180° (with remaining cloudiness to 195°) after crystallization from ether.

EXAMPLE 8 a. From 8.5 g. of 8-(2,6-difluorophenyl)-1-ethyl-4,6-dihydro-3-methylpyrazolo[4,3-e][1,4]diazepin-5(1H)-one, 7.5 g. of stannic chloride and 6 g. of propylene oxide in 600 ml. of benzene, following the procedure of Example 7, there is obtained 10a-(2,6-difluorophenyl)-1-ethyl-4,8,9,10a-tetrahydro-3,9-dimethyl-1H-oxazolo[3,2-d]pyrazolo[3,4-f][1,4]diazepin-5(6H)-one; m.p. 175°–180° after crystallization from ether.

b. From 8.5 g. of 8-(2,6-difluorophenyl)-4,6-dihydro-1,3,4-trimethylpyrazolo[4,3-e][1,4]diazepin-5(1H)-one in 600 ml. of benzene, 7.5 g. of stannic chloride and 6 g. of propylene oxide, following the above procedure there is obtained 10a-(2,6-difluorophenyl)-4,8,9,10a-tetrahydro-1,3,4,9-tetramethyl-1H- oxazolo[3,2-d]pyrazolo[3,4-f]-[1,4]diazepin-5(6H)-one; m.p. 183°–186° after crystallization from ether.

EXAMPLE 9

A mixture of 17.5 g. of 5-benzoyl-2-bromoacetamido)-1-ethyl-3-methylpyrazole (m.p. 139°–140°, obtained by neutralization of a solution of the hydrobromide salt, U.S. Pat. No. 3,557,095), 4.6 g. of 1-amino-2-propanol, 4.9 g. of anhydrous sodium acetate and 200 ml. of methanol is stirred and heated at reflux for 16 hours, then evaporated at reduced pressure. The residue is extracted with dichloromethane and the extract is washed with water, dried and evaporated at reduced pressure to give 1-ethyl-4,8,9,10a-tetrahydro-3,9-dimethyl-10a-phenyl-1H-oxazolo-[3,2-d]pyrazolo[3,4-f][1,4]diazepin-5(6H)-one; m.p. 204°–206° after crystallization from aqueous ethanol and from acetonitrile.

EXAMPLE 10

A mixture of 18.6 g. of 5-benzoyl-4-(2-bromoacetamido)-1-ethyl-3-methylpyrazole, 10.7 g. of 2-amino-1-propanol hydrochloride, 15.6 g. of anhydrous sodium acetate and 200 ml. of methanol is stirred and heated at reflux for 48 hours, then evaporated at reduced pressure. The residue is extracted with dichloromethane and the extract is washed with water, dried and evaporated at reduced pressure to give 1-ethyl-4,8,9,10a-tetrahydro-3,8-dimethyl-10a-phenyl-1H-oxazolo[3,2-d]pyrazolo[3,4-f][1,4]-diazepin-5(6H)-one; m.p. 234°–236.5° after crystallization from acetonitrile, from nitromethane and from ethanolmethanol.

EXAMPLE 11

A solution of 10 g. of 4-(2-bromoacetamido)-5-(2,6-difluorobenzoyl)-1-ethyl-3-methylpyrazole, 10 g. of 2-aminoethanol and 10 ml. of triethylamine in 200 ml. of ethanol is heated at reflux for 24 hours, then evaporated at reduced pressure. The residue is dissolved in acetonitrile and the solution is passed through a column of neutral activated alumina. The eluate is collected and evaporated at reduced pressure to give 5-(2,6-difluorobenzoyl)-1-ethyl-4-[2-(2-hydroxyethylamino)acetamido]-3-methylpyrazole; m.p. 104°–106° after crystallization from ethyl acetate-petroleum ether. This ketone is dissolved in 50 ml. of pyridine, 0.5 g. of pyridine hydrochloride is added and the solution is heated at reflux for 36 hours, then evaporated at reduced pressure. The residue is dissolved in acetonitrile and the solution is passed through a column of neutral activated alumina. The eluate is collected and evaporated at reduced pressure to give 10a-(2,6-difluorophenyl)-1-ethyl-4,8,9,10a-tetrahydro-3-methyl-1H-oxazolo[3,2-d] pyrazolo[3,4-f][1,4]diazepin-5(6H)-one.

EXAMPLE 12

A solution of 18 g. of 4-(2-bromoacetamido)-5-(2,6-difluorobenzoyl)-1,3-dimethylpyrazole, 11 g. of 1-amino-2-propanol and 10 ml. of triethylamine in 50 ml. of dimethylformamide is allowed to stand at room temperature for 16 hours, then evaporated at reduced pressure. The residue is partitioned between 1N hydrochloric acid and ether. The aqueous phase is separated, basified with concentrated aqueous sodium hydroxide and extracted with dichloromethane. The dichloromethane extract is washed with water, dried and evaporated to give 5-(2,6-difluorobenzoyl)-4-[2-(2-hydroxypropylamino)acetamido]-1,3-dimethylpyrazole. This ketone is dissolved in 80 ml. of pyridine, 0.5 g. of pyridine hydrochloride is added and the solution is heated at reflux for 20 hours, then evaporated at reduced pressure. The residue is dissolved in acetonitrile and the solution is passed through a column of neutral activated alumina. The eluate is collected and evaporated at reduced pressure to give 10a-(2,6-difluorophenyl)-4,8,9,10a-tetrahydro-1,3,9-trimethyl-1H-oxazolo[3,2-d]pyrazolo[3,4-f][1,4]diazepin-5(6H)-one; m.p. 195°–200° (with preliminary softening) after crystallization from ether.

EXAMPLE 13

A solution of 17.5 g. of 5-benzoyl-4-(2-bromoacetamido)-1-ethyl-3-methylpyrazole, 11 g. of 1-amino-2-propanol and 14 ml. of triethylamine in 50 ml. of dimethylformamide is allowed to stand at room temperature for 16 hours, then poured into 400 ml. of ice water. The mixture is extracted with two 200 ml. portions of dichloromethane. The combined extract is washed twice with water and evaporated at reduced pressure. The residue is dissolved in 200 ml. of 1N hydrochloric acid, the solution is allowed to stand at room temperature for 3 hours and is washed with ether. The aqueous solution is basified with concentrated aqueous sodium hydroxide and extracted with dichloromethane. The dichloromethane extract is washed with water, dried and evaporated at reduced pressure to give 5-benzoyl-1-ethyl-4-[2-(2-hydroxypropylamino)acetamido]-3-methylpyrazole. A solution of 6.0 g. of this ketone and 0.5 g. of pyridine hydrochloride in 60 ml. of pyridine is heated at reflux for 18 hours, then evaporated at reduced pressure. The residue is dissolved in dichloromethane and the solution is washed with dilute aqueous sodium bicarbonate, dried and evaporated at reduced pressure to give 1-ethyl-4,8,9,10a-tetrahydro-3,9-dimethyl-10a-phenyl-1H-oxazolo[3,2-d]pyrazolo[3,4-f][1,4]diazepin-5(6H)-one; m.p. 205°–207° after crystallization from acetonitrile.

EXAMPLE 14

A mixture of 17.5 g. of 5-benzoyl-4-(2-bromoacetamido)-1-ethyl-3-methylpyrazole, 12.3 g. of 2-amino-1-phenylethanol, 5.4 g. of anhydrous sodium acetate and 200 ml. of methanol is stirred and heated at reflux for 48 hours, then evaporated at reduced pressure. The residue is extracted with dichloromethane and the extract is washed with water, dried and evaporated at reduced pressure to give 1-ethyl-4,8,9,10a-tetrahydro-3-methyl-9,10a-diphenyl-1H-oxazolo[3,2-d]pyrazolo[3,4-f][1,4]diazepin-5(6H)-one; m.p. 195°–196.5° after crystallization from aqueous ethanol, from toluene-pentane and from acetonitrile.

EXAMPLE 15

A solution of 17.5 g. of 5-benzoyl-4-(2-bromoacetamido)-1-ethyl-3-methylpyrazole, 37.5 g. of 3-amino-1-propanol and 50 ml. of triethylamine in 300 ml. of ethanol is heated at reflux for 24 hours, then evaporated at reduced pressure. The residue is dissolved in toluene, 5 drops of 20% chloride in 2-propanol is added and the solution is heated at reflux for 4 days. The solution is cooled, washed with water, dried and evaporated to give 1-ethyl-4,9,10,11a-tetrahydro-3-methyl-11a-phenyl-1H,8H-[1,3]-oxazino[3,2-d]pyrazolo[3,4-f][1,4]diazepin-5(6H)-one; m.p. 220°–223° after two crystallizations from aqueous ethanol.

EXAMPLE 16

A mixture of 22 g. of 4-amino-5-benzoyl-1-ethyl-3-methylpyrazole (U.S. Pat. No. 3,557,095) and 15 g. of 1-amino-2-propanol is heated at 170°–180° for 4 hours, then distilled at reduced pressure. The fraction boiling at 170°–180°/0.7 mm. is collected; it is a mixture of 4-amino-1-ethyl-5-[N-(2-hydroxypropyl)benzimidoyl]-3-methylpyrazole and 2-(4-amino-1-ethyl-3-methylpyrazol-5-yl)-5-methyl-2-phenyloxazolidine. To a stirred solution of 9 g. of this mixture in 200 ml. of dioxane at 5° is added 6 g. of pyridine, then, dropwise, 7 g. of bromoacetyl bromide. The mixture is stirred at 5°–10° for 30 minutes, then at room temperature for 16 hours. The resulting mixture is stirred with 300 ml. of dichloromethane and 150 ml. of water. The organic phase is separated, washed with water, dried and evaporated at reduced pressure to give 1-ethyl-4,8,9,10a-tetrahydro-3,9-dimethyl-10a-phenyl-1H-oxazolo[3,2-d]pyrazolo[3,4-f][1,4]-diazepin-5(6H)-one; m.p. 204°–206° after crystallization from acetonitrile.

EXAMPLE 17 a. A solution of 3.3 g. of 1-ethyl-4,8,9,10a-tetrahydro-3,9-dimethyl-10a-phenyl-1H-oxazolo[3,2-d]-pyrazolo[3,4-f][1,4]diazepin-5(6H)-one (Examples 5,13,17, and 20) in 100 ml. of dimethylformamide is cooled to 0°–5° and treated under a nitrogen atmosphere with 0.75 g. of a 50% sodium hydride dispersion in mineral oil. The mixture is stirred for 15 minutes, 2 ml. of iodomethane is added and stirring is continued for 4 hours at 10°. The mixture is evaporated at reduced pressure and the residue is extracted with warm ethyl acetate. The extract is washed with water, dried and evaporated at reduced pressure to give 1-ethyl-4,8,9,10a-tetrahydro-3,4,9-trimethyl-10a-phenyl-1H-oxazolo[3,2-d]pyrazolo[3,4-f][1,4]diazepin-5(6H)-one; m.p. 121°–124° after crystallization from ether.

b. From 2.5 g. of 10a-(2,6-difluorophenyl-4,8,9,10a-tetrahydro-1,3,9-trimethyl-1H-oxazolo-[3,2-d]-pyrazolo[3,4-f][1,4]diazepin-5(6H)-one, 0.6 g. of a 50% sodium hydride dispersion in mineral oil and 1.5 ml. of iodomethane in 40 ml. of dimethylformamide, following the above procedure, there is obtained 10a-(2,6-difluorophenyl)-4,8,9,10a-tetrahydro-1,3,4,9-tetramethyl-1H-oxazolo[3,2-d]pyrazolo[3,4-f][1,4]diazepin-5(6H)-one; m.p. 183°–186° after crystallization from ether.

INTERMEDIATES

The various starting materials and intermediates employed in the foregoing examples are prepared by the methods described in the following.

A. 5-AROYL-4-NITROPYRAZOLES 1.
5-(2,6-Difluorobenzoyl)-1,3-dimethyl-4-nitropyrazole To a stirred solution of 36 g. of m-difluorobenzene in 300 ml. of tetrahydrofuran maintained at −60° under a nitrogen atmosphere, is added dropwise 190 ml. of a 1.58 M solution of butyl lithium in heptane over a period of 40 minutes. The resulting suspension is stirred 5 hours at −60°, then added in portions to a stirred solution of 55 g. of 1,3-dimethyl-4-nitropyrazole-5-carbonyl chloride (U.S. Pat. No. 3,557,095) in 300 ml. of tetrahydrofuran maintained at −50°. The mixture is stirred while allowing it to warm to room temperature and is then evaporated at reduced pressure. The residue is treated with 400 ml. of 1N aqueous sodium hydroxide and the mixture is stirred for 1 hour. The resulting solid, 5-(2,6-difluorobenzoyl)-1,3-dimethyl-4-nitropyrazole, is removed by filtration, washed with water and dried; m.p. 112°–114° after crystallization from ether.

2.
5-(2,6-Difluorobenzoyl)-1-ethyl-3-methyl-4-nitropyrazole

Obtained by the method of 1. above by the reaction of 36 g. of m-difluorobenzene in 400 ml. of tetrahydrofuran with 190 ml. of a 1.58 M solution of butyl lithium in heptane followed by reaction with 70 g. of 1-ethyl-3-methyl-4-nitropyrazolecarbonyl chloride (U.S. Pat. No. 3,557,095) in 300 ml. of tetrahydrofuran; m.p. 125°–127° after crystallization from ether-petroleum ether.

3. 5-(o-Fluorobenzoyl)-1,3-dimethyl-4-nitropyrazole

To a stirred solution of 65 ml. of a 1.58 M solution of butyl lithium in heptane and 100 ml. of tetrahydrofuran maintained at −65° under a nitrogen atmosphere, is added a solution of 19.5 g. of o-bromofluorobenzene in 15 ml. of tetrahydrofuran. The resulting suspension is stirred at −65° for 10 minutes, then added cold in a slow stream to a stirred solution of 22 g. of 1,3-dimethyl-4-nitro-5-pyrazolecarbonyl chloride in 200 ml. of tetrahydrofuran maintained at −60° to −70°. The mixture is stirred while allowing it to warm to room temperature and is then evaporated at reduced pressure. The residue is stirred thoroughly with a mixture of 300 ml. of benzene and 200 ml. of 1N aqueous sodium hydroxide. The organic phase is separated, washed with water, dried and evaporated at reduced pressure to give 5-(o-fluorobenzoyl)-1,3-dimethyl-4-nitropyrazole; m.p. 78°–80° after crystallization from ethyl acetate-petroleum ether.

4.
1-Ethyl-5-(o-fluorobenzoyl)-3-methyl-4-nitropyrazole

Obtained by the method of 3. above by the reaction of 650 ml. of a 1.58 M solution of butyl lithium in heptane and 300 ml. of tetrahydrofuran with 185 g. of o-bromofluorobenzene in 100 ml. of tetrahydrofuran followed by reaction with 230 g. of 1-ethyl-3-methyl-4-nitropyrazolecarbonyl chloride in 700 ml. of tetrahydrofuran; m.p. 70°–73° after crystallization from ether-petroleum ether.

B. 4-AMINO-5-AROYLPYRAZOLES 1.
4-Amino-5-(2,6-difluorobenzoyl)-1,3-dimethylpyrazole To a solution of 65 g. of 5-(2,6-difluorobenzoyl)-1,3-dimethyl-4-nitropyrazole in 400 ml. of 95% ethanol and 120 ml. of water, is added 65 g. of iron powder and 5 ml. of concentrated hydrochloric acid. The mixture is stirred and heated at reflux for 2 hours, then cooled and filtered through diatomaceous earth (Super-Cel). The filter cake is washed thoroughly with ethanol and the combined filtrate evaporated at reduced pressure. The residue is dissolved in excess warm 3N hydrochloric acid and the solution washed with ether. The aqueous solution is basified with concentrated aqueous sodium hydroxide and extracted with dichloromethane. The extract is washed with saturated aqueous sodium chloride, dried and evaporated at reduced pressure to give 4-amino-5-(2,6-difluorobenzoyl)-1,3-dimethylpyrazole as an oil, suitable for use without further purification.

2. 4-Amino-5-(2,6-difluorobenzoyl)-1-ethyl-3-methylpyrazole

Obtained by the method of 1. above by the reaction of 70 g. of 5-(2,6-difluorobenzoyl)-1-ethyl-3-methyl-4-nitropyrazole in 400 ml. of 95% ethanol and 120 ml. of water with 65 g. of iron powder and 6 ml. of concentrated hydrochloric acid; m.p. 94°–96° after crystallization from ether-petroleum ether.

3. 4-Amino-5-(o-fluorobenzoyl)-1,3-dimethylpyrazole

Obtained as an oil by the method of 1. above by the reaction of 17 g. of 5-(o-fluorobenzoyl)-1,3-dimethyl-4-nitropyrazole in 100 ml. of 95% ethanol and 30 ml. of water with 25 g. of iron powder and 2 ml. of concentrated hydrochloric acid.

4. 4-Amino-1-ethyl-5-(o-fluorobenzoyl)-3-methylpyrazole

Obtained as an oil the method of 1. above by the reaction of 27.7 g. of 1-ethyl-5-(o-fluorobenzoyl)-3-methyl-4-nitropyrazole in 200 ml. of 95% ethanol and 60 ml. of water with 27 g. of iron powder and 3 ml. of concentrated hydrochloric acid.

C. 5-AROYL-4-(2-BROMOACETAMIDO)PYRAZOLES

1. 4-(2-Bromoacetamido)-5-(2,6-difluorobenzoyl)-1,3-dimethylpyrazole

To a stirred mixture of 42 g. of 4-amino-5-(2,6-difluorobenzoyl)-1,3-dimethylpyrazole dissolved in 600 ml. of 1,2-dichloroethane, 100 ml. of water and 20 g. of calcium carbonate, is added dropwise 36 g. of bromoacetyl bromide. The mixture is stirred at room temperature for 3 hours, then filtered. The organic phase is separated from the filtrate, dried and evaporated at reduced pressure to give 4-(2-bromoacetamido)-5-(2,6-difluorobenzoyl)-1,3-dimethylpyrazole; m.p. 173°–175° after trituration with ether and crystallization from ethyl acetate.

2. 4-(2-Bromoacetamido)-5-(2,6-difluorobenzoyl)-1-ethyl-3-methylpyrazole

Obtained by the method of 1. above by the reaction of 40 g. of 4-amino-5-(2,6-difluorobenzoyl)-1-ethyl-3-methypyrazole in 600 ml. of 1,2-dichloroethane with 31 g. of bromoacetyl bromide in the presence of 100 ml. of water and 18 g. of calcium carbonate; m.p. 160°–162° after trituration with ether and crystallization from ethyl acetate-petroleum ether.

3. 4-(2-Bromoacetamido)-5-(o-fluorobenzoyl)-1,3-dimethylpyrazole

Obtained by the method of 1. above by the reaction of 14 g. of 4-amino-5-(o-fluorobenzoyl)-1,3-dimethylpyrazole in 200 ml. of 1,2-dichloroethane with 15 g. of bromoacetyl bromide in the presence of 50 ml. of water and 10 g. of calcium carbonate; m.p. 155°–156° after crystallization from aqueous ethanol.

4. 4-(2-Bromoacetamido)-1-ethyl-5-(o-fluorobenzoyl)-3-methylpyrazole

Obtained by the method of 1. above by the reaction of 169 g. of 4-amino-1-ethyl-5-(o-fluorobenzoyl)-3-methylpyrazole in 1.8 liters of 1,2-dichloroethane with 150 g. of bromoacetyl bromide in the presence of 400 ml. of water and 92 g. of calcium carbonate; m.p. 102°–104° after crystallization from 1,2-dichloroethane-petroleum ether.

D. 5-AROYL-4-(2-AZIDOACETAMIDO)PYRAZOLES

1. 4-(2-Azidoacetamido)-5-(2,6-difluorobenzoyl)-1,3-dimethylpyrazole

A mixture of 18.5 g. of 4-(2-bromoacetamido)-5-(2,6-difluorobenzoyl)-1,3-dimethylpyrazole and 4 g. of sodium azide in 50 ml. of dimethylformamide is stirred at 30°–35° for 3 hours, then poured into 500 ml. of ice water. The resulting precipitate of 4-(2-azidoacetamido)-5-(2,6-difluorobenzoyl)-1,3-dimethylpyrazole is collected by filtration washed with water and dried; m.p. 161°–163° after crystallization from ethyl acetate-petroleum ether.

2. 4-(2-Azidoacetamido)-5-(2,6-difluorobenzoyl)-1-ethyl-3-methylpyrazole

Obtained by the method of 1. above by the reaction of 19.3 g. of 4-(2-bromoacetamido)-5-(2,6-difluorobenzoyl)-1-ethyl-3-methylpyrazole with 4 g. of sodium azide in 50 ml. of dimethylformamide; m.p. 135°–137° after crystallization from ethyl acetate-petroleum ether.

3. 4-(2-Azidoacetamido)-5-(o-fluorobenzoyl)-1,3-dimethylpyrazole

Obtained by the method of 1. above by the reaction of 13 g. of 4-(2-bromoacetamido)-5-(o-fluorobenzyl)-1,3-dimethylpyrazole with 3.3 g. of sodium azide in 30 ml. of dimethylformamide; m.p. 133°–135° after crystallization from ethyl acetate-petroleum ether.

4. 4-(2-Azidoacetamido)-1-ethyl-4-(o-fluorobenzoyl)-3-methylpyrazole

Obtained by the method of 1. above of the reaction of 24.5 g. of 4-(2-bromoacetamido)-1-ethyl-5-(o-fluorobenzoyl)-3-methylpyrazole with 5.3 g of sodium azide in 40 ml. of dimethylformamide; m.p. 108°–109° after crystallization from dichloromethane-petroleum ether.

E. PYRAZOLODIAZEPINONES

1.
8-(2,6-Difluorophenyl)-4,6-dihydro-1,3-dimethyl-pyrazolo[4,3-e][1,4]diazepin-5(1H)-one

To a solution of 14.9 g. of 4-(2-azidoacetamido)-5-(2,6-difluorobenzoyl)-1,3-dimethylpyrazole in 150 ml. of glacial acetic acid, is added 1.0 g. of 5% palladium on charcoal and the mixture is shaken with hydrogen at a pressure of 50 lbs./in$^2$ for 2 hours at room temperature. The catalyst is removed by filtration and the filtrate evaporated at reduced pressure. The residue is dissolved in dichloromethane. The solution is washed twice with saturated aqueous sodium bicarbonate, dried and evaporated at reduced pressure to give 8-(2,6-difluorophenyl)-4,6-dihydro-1,3-dimethyl-pyrazolo[4,3-e][1,4]diazepin-5(1H)-one; m.p. 248°–250° after crystallization from tetrahydrofuran-ether.

1.
8-(2,6-Difluorophenyl-1-ethyl-4,6-dihydro-3-methyl-pyrazolo[4,3-e][1,4]diazepin-5(1H)-one

Obtained by the method of 1. above by the hydrogenation of 16 g. of 4-(2-azidoacetamido)-5-(2,6-difluorobenzoyl)-1-ethyl-3-methylpyrazole dissolved in 160 ml. of glacial acetic acid in the presence of 1.0 g. of 5% palladium on charcoal; m.p. 168°–170°after crystallization from ether.

3.
8-(o-Fluorophenyl)-4,6-dihydro-1,3-dimethylpyrazolo-[4,3-e][1,4]diazepin-5(1H)-one

Obtained by the method of 1. above by the hydrogenation of 9.3 g. of 4-(2-azidoacetamido)-5-o-fluorobenzoyl)-1,3-dimethylpyrazole dissolved in 100 ml. of glacial acetic acid in the presence of 0.5 g. of 5% of palladium on charcoal; m.p. 245°–247° after crystallization from acetonitrile.

4.
1-Ethyl-8-(o-fluorophenyl)-4,6-dihydro-1,3-dimethyl-pyrazolo[4,3-e][1,4]diazepin-5(1H)-one

Obtained by the method of 1. above by the hydrogenation of 16.9 g. of 4-(2-azidoacetamido)-1-ethyl-5-(o-fluorobenzoyl)-3-methylpyrazole dissolved in 160 ml. of acetic acid in the presence of 1.0 g. of 5% palladium on charcoal; m.p. 216°–217° after crystallization from acetonitrile.

5.
8-(2,6-Difluorophenyl)-4,6-dihydro-1,3,4-trimethyl-pyrazolo[4,3-e][1,4]diazepin-5(1H)-one

To a solution of 3.5 of 8-(2,6-difluorophenyl)-4,6-dihydro-1,3-dimethylpyrazolo[4,3-e][1,4]-diazepin-5(1H)-one (1. above) in 20 ml. of dimethylformamide, is added 3 ml. of iodomethane, then 0.6 g. of a 50% sodium hydride dispersion in mineral oil. The mixture is stirred at room temperature for 1 hour, then poured into 300 ml. of water. The mixture is extracted with ethyl acetate and the extract is washed with water, dried and evaporated at reduced pressure to give 8-(2,6-difluorophenyl)-4,6-dihydro-1,3,4,-trimethyl-pyrazolo[4,3-e][1,4]diazepin-5(1H)-one; m.p. 191°–193° after crystallization from ethyl acetatepetroleum ether.

6.
8-(2,6-Difluorophenyl)-1-ethyl-4,6-dihydro-3,4-dimethylpyrazolo[4,3-e][1,4]diazepin-5(1H)-one

Obtained by the method of 5. above by the alkylation of 2.5 g. of 8-(2,6-difluorophenyl)-1-ethyl-4,6-dihydro-3-methylpyrazolo[4,3-e][1,4]diazepin-5(1H)-one (2. above) dissolved in 30 ml. of dimethylformamide with 3 ml. of iodomethane in the presence of 0.6 g. of a 50% sodium hydride dispersion in mineral oil; m.p. 147°–148° after crystallization from ether.

We claim:
1. A compound of the formula

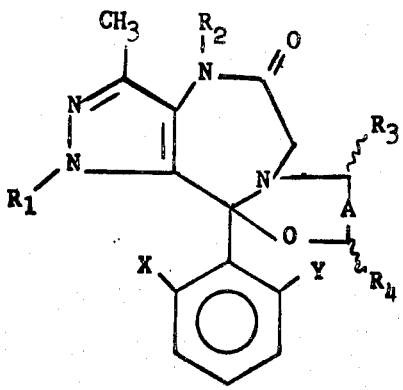

wherein $R_1$ is a branched or straight chain hydrocarbon group of from one to four carbon atoms; $R_2$ and $R_3$ are selected from the group consisting of hydrogen and methyl; $R_4$ is selected from the group consisting of hydrogen, methyl, ethyl and phenyl; X and Y are selected from the group consisting of hydrogen and fluorine and A is selected from the group consisting of a single bond and a methylene radical; with the provisio that at least one of $R_3$ and $R_4$ is hydrogen; and when A is methylene both $R_3$ and $R_4$ are hydrogen.

2. A compound of claim 1 wherein $R_1$ is a straight or branched chain hydrocarbon group of from one to three carbon atoms, $R_2$ and $R_3$ are hydrogen, $R_4$ is selected from the group consisting of hydrogen and methyl, X and Y are selected from the group consisting of hydrogen and fluorine and A is a single bond.

3. A compound according to claim 2 which is 1-ethyl-4,8,9,10a-tetrahydro-3,9-dimethyl-10a-phenyl-1H-oxazolo[3,2-d]pyrazolo[3,4-f][1,4]diazepin-5(6H)-one.

4. A compound according to claim 2 which is 1-ethyl-4,8,9,10a-tetrahydro-3-methyl-10a-phenyl-1H-oxazolo[3,2-d]pyrazolo[3,4-f][1,4]diazepin-5(6H)-one.

5. A compound according to claim 2 which is 10a-(2,6-difluorophenyl)-4,8,9,10a-tetrahydro-1,3,9-trimethyl-1H-oxazolo[3,2-d]pyrazolo[3,4-f][1,4]diazepin-5-(6H)-one.

6. A compound according to claim 2 which is 1-ethyl-10a-(o-fluorophenyl)-4,8,9,10-a-tetrahydro-3,9-dimethyl-1H-oxazolo[3,2-d]pyrazolo[3,4-f][1,4]diazepin-5(6H)-one.

* * * * *